United States Patent
Yeo et al.

(10) Patent No.: US 6,714,497 B2
(45) Date of Patent: *Mar. 30, 2004

(54) METHOD FOR FORMING AN INFORMATION RECORDING MEDIUM HAVING INFORMATION ON SPARE AREA, AND METHOD AND APPARATUS FOR RECORDING/REPRODUCING DATA TO/FROM THE MEDIUM

(75) Inventors: Woon-Sung Yeo, Chungcheongbukdo (KR); Yeo-Han Yun, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 10/345,149

(22) Filed: Jan. 16, 2003

(65) Prior Publication Data

US 2003/0103427 A1 Jun. 5, 2003

Related U.S. Application Data

(60) Continuation of application No. 10/288,492, filed on Nov. 6, 2002, now Pat. No. 6,654,330, which is a division of application No. 09/307,000, filed on May 7, 1999, now Pat. No. 6,510,114.

(30) Foreign Application Priority Data

May 9, 1998 (KR) .............................................. 98-16669

(51) Int. Cl.[7] ................................................ G11B 7/00
(52) U.S. Cl. ................ 369/53.2; 369/53.15; 369/53.17; 369/47.14
(58) Field of Search ........................... 369/47.14, 275.3, 369/275.1, 53.17, 53.24, 59.25, 53.29; 714/8, 710, 4; 711/4

(56) References Cited

U.S. PATENT DOCUMENTS

| | | | |
|---|---|---|---|
| 4,811,124 A | 3/1989 | Dujari et al. ............. | 369/53.17 |
| 5,111,444 A | 5/1992 | Fukushima et al. ...... | 369/53.17 |
| 5,235,585 A | 8/1993 | Bish et al. ................ | 369/53.17 |
| 5,623,470 A | 4/1997 | Asthana et al. .......... | 369/47.49 |
| 5,835,930 A | 11/1998 | Dobbek ........................ | 711/4 |
| 5,841,748 A | 11/1998 | Yamamuro ............... | 369/47.14 |
| 5,878,020 A | 3/1999 | Takahashi ................ | 369/59.25 |
| 5,896,364 A * | 4/1999 | Okazaki et al. .......... | 369/275.3 |
| 6,078,559 A | 6/2000 | Takemura et al. ....... | 360/275.3 |
| 6,134,214 A | 10/2000 | Takagi et al. ............ | 369/47.14 |
| 6,189,118 B1 | 2/2001 | Sasaki et al. ............... | 714/710 |
| 6,469,978 B1 * | 10/2002 | Ohata et al. ............. | 369/275.3 |

* cited by examiner

Primary Examiner—William Korzuch
Assistant Examiner—Kim-Kwok Chu
(74) Attorney, Agent, or Firm—Birch, Stewart, Kolasch & Birch, LLP

(57) ABSTRACT

This invention provides an information recording medium, and a method and apparatus for writing to/reading from a recording medium in which a starting point of a spare area is variable relative to a starting point of a data area. Information concerning a variable boundary between the data area and the spare area is stored on the recording medium. A method and apparatus for writing/reproducing data to/from the recording medium is also provided. In a preferred embodiment, the recording medium is an optical disc.

14 Claims, 11 Drawing Sheets

METHOD FOR FORMING AN INFORMATION RECORDING MEDIUM HAVING INFORMATION ON SPARE AREA, AND METHOD AND APPARATUS FOR RECORDING/REPRODUCING DATA TO/FROM THE MEDIUM

This application is a continuation of application Ser. No. 10/288,492 filed on Nov. 6, 2002, now U.S. Pat. No. 6,654,330 which is a divisional of Ser. No. 09/307,000 filed on May 7, 1999, now U.S. Pat. No. 6,510,114 B1, issued on Jan. 21, 2003, the entire contents of which are hereby incorporated by reference and for which priority is claimed under 35 U.S.C. §120; and this application claims priority of Application No. 98-16669 filed in Republic of Korea on May 9, 1998 under 35 U.S.C. §119.

BACKGROUND OF THE INVENTION

1. Field of the Invention

The present invention relates to a method and apparatus for manufacturing an optical recording medium in which ratios of spare area to data area differ from one zone to another, depending on each zone's location in the radial direction, and which has information needed to discriminate data area and spare area in each zone, and to a method and apparatus for writing/reproducing data to/from the optical recording medium.

2. Description of the Related Art

Optical discs have come into wide use since the advent of CD (compact disc). The demand for optical discs is expected to grow steadily with popularization of DVD (digital versatile disc). Optical discs include read-only discs such as CD-ROM and DVD-ROM, write-once discs such as CD-R and DVD-R, and rewritable discs such as CD-RW and DVD-RAM. Standard formats of CD-RW and DVD-RAM have been released and standardization for DVD-R is in progress.

As shown in FIG. 1, the rewritable physical area of DVD-RAM has a lead-in area, a user area, and a lead-out area. The user area is divided into 24 contiguous groups, so-called zones, and guard areas are situated before and behind each zone. Each zone is made up of a data area for recording data and a spare area for replacing a defective portion of the data area.

The data area is made up of a plurality of ECC (error correction code) blocks, each consisting of 16 sectors. The location of each sector is specified by a physical sector number (PSN) that is given uniquely to each sector. That is, a PSN is assigned to every sector from the inner diameter to the outer diameter. While recording, LSNs (logical sector number) are assigned to only non-defective sectors sequentially.

Tracks located in the same zone have an equal number of sectors. As the track length is increased by the angular length per sector from inside out, the number of sectors per track is increased by 1 and a new zone identification number is assigned. For every zone, CLV (constant linear velocity) is employed, but CAV (constant angular velocity) is used for tracks within the same zone.

For rewritable optical discs such as DVD-RAM, defects that arise in their recording surface should be managed to achieve highly reliable write/reproduction operation in a manner that data is not written to sectors in which read-out errors are detected beyond a predetermined level (hereinafter referred to as "defective" or "bad" sectors). To accomplish this, defect management is performed such that addresses of defective sectors are stored in defect management tables on the optical disc and access to data on such defective sectors is prohibited. As shown in FIG. 2, if a defective sector is detected during a write operation, it is replaced by the next valid sector (slipping replacement). When a bad sector is detected during a reproduction operation, an ECC block containing the bad sector is replaced by a unused ECC block in a spare area, as shown in FIG. 3 (linear replacement).

Defect management information, or physical addresses of defective sectors within the data area are stored in a DMA (defective management area), which is provided in four places, two in a lead-in area and the other two in a lead-out area, as shown in FIG. 1, to protect against the defects which may arise in the four DMAs themselves.

The DMA is made up of two ECC blocks, or 32 sectors. The first ECC block consists of one sector for a DDS (disc definition structure) and 15 other sectors for a PDL (primary defect list). Sixteen sectors of the second ECC block are all used for a SDL (secondary defect list).

As shown in FIG. 4, each track of DVD-RAM is, physically, made up of a recording portion A for recording user data and a header portion B for providing positional information and indicating whether the track is a groove track or land track. Groove tracks and land tracks are arranged alternately, and wobble boundaries C are formed between groove tracks and land tracks. The wobble shape of the boundary C is used to generate a periodic signal of low frequency and thus provide a channel clock for detection of signal from the optical disc while the optical disc is rotated in the CAV mode.

For the optical disc described above, in the conventional art, a ratio of spare area to data area is provided equally for every zone, about 5%, as shown in FIG. 5A. A zone has 875 more sectors than the next most-inwardly located zone because every zone has 875=(21000 tracks/disc)/(24 zones/disc) tracks and the number of sectors per track is increased by 1 for every track. Hence, more spare area is provided for zones near the outer radii than for zones near the inner radii.

However, as shown in waveform 51 of FIG. 5A, experimental observations shows a tendency that more defects arise in zones near the inner or outer radii than in zones near the central radii because of problems of deposition by sputtering in the disc manufacturing process. The waveform 51 of FIG. 5(a) is parabolic.

Hence, in case where a constant ratio of spare area to data area is set to every zone, as shown in waveform 50 of FIG. 5A, it may happen that, while zones near the inner or outer radii run short of the spare area for replacement of defective areas on the data area, a large amount of spare area is not used in the zones near the central radii.

Moreover, in a conventional disc, there exists a ratio between the size of the spare area and data area that is maintained constant throughout the disc. Thus, conventional systems can recognize the boundary between the data area and the spare area without referring to any stored information concerning that boundary because the boundary has already been fixed by DVD disc physical specifications and can be calculated by a program in which the constant ratio is considered.

But, if the boundary is varied and boundary information is not written on a disc, the system can neither recognize exact boundary nor calculate boundary information by any program.

SUMMARY OF THE INVENTION

One object of the invention is to record boundary information in a predetermined location on a disc so that a system can recognize it and perform the proper operation of recording, reproduction and replacement of defective areas when the position of a boundary between the spare area and the data area is varied, which object is not limited to a disc having a plurality of zones or a constant ratio between the spare area and data area.

It is an object of the present invention to provide a method and apparatus for manufacturing an optical recording medium in which the ratio of a spare area to a data area varies according to the radial range of the corresponding zones, respectively, and which has information in a predetermined area of said medium needed to discriminate between a data area and a spare area.

It is another object of the present invention to provide a method and apparatus for writing/reproducing data to/from said optical recording medium in which the ratio of the spare area to the data area varies according to the radial range of the corresponding zones, respectively, and has information in a predetermined area of said medium needed to discriminate between the data area and the spare area.

To achieve these and other objects, the present invention provides a method and apparatus for manufacturing an optical recording medium, the recording area being made up of a plurality of zones and having a data area and a spare area and information needed to discriminate among the data area and the spare area. According to the method and apparatus, in one or more zones, the ratio of the spare area to the data area varies depending on the corresponding locations or those areas relative to the optical recording medium. Information needed to discriminate a data area and from a spare area, e.g., boundaries between the two areas which are changed with the ratios, is written as a physical shape or as a normally written signal into a predetermined area on the optical recording medium.

In the method and apparatus for writing data to said optical recording medium having information needed to discriminate among the data area and the spare area according to the present invention, the ratio of spare area to data area varies depending on the relative location of the zones on the optical recording medium. Information needed to discriminate a data area from a spare area, e.g., the boundary between the two areas, is recorded on a predetermined area on the optical recording medium. Thereafter, when a write operation is requested, the boundary information is used to locate the appropriate area.

In the method and apparatus for reproducing data from an optical recording medium having information needed to discriminate the data areas from the spare area according to the present invention, information needed to discriminate a data area from a spare area, the boundary between the two areas, is read out from a predetermined area on the optical recording medium. Referring to the boundary information, data recorded in the data area is reproduced and data allocated to defective areas on the data area is moved into the corresponding region of the spare area for replacement.

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, illustrate the preferred embodiment of this invention, and together with the description, serve to explain rather than limit the principles of the present invention.

In the drawings.

DETAILED DESCRIPTION OF THE PREFERRED EMBODIMENTS

The preferred embodiments of the present invention will be described below in detail referring to the accompanying drawings.

Method and Apparatus for Manufacturing an Optical Disc

Figure 6:
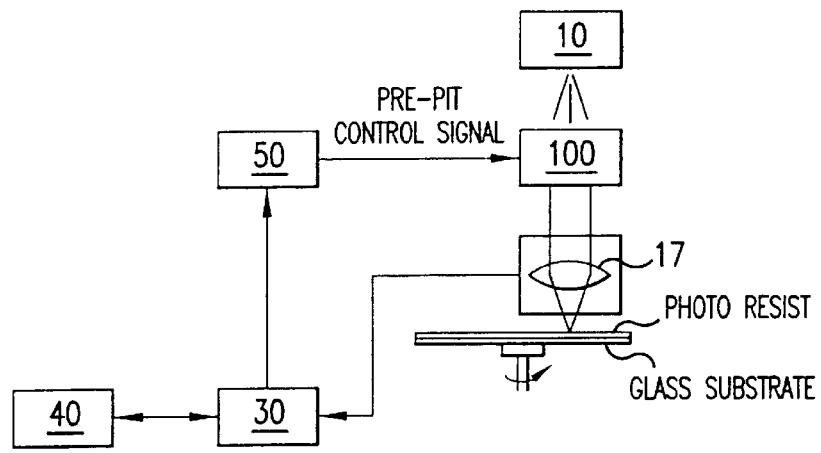
FIG. 6 is a schematic diagram of an apparatus for manufacturing an optical recording medium having information needed to discriminate data area and spare area according to the present invention.

FIG. 6 shows an apparatus for manufacturing an optical disc having information needed to discriminate data areas and spare areas according to the present invention. The apparatus comprises a ratio setting unit 40 for keeping each zone's ratio of spare area to data area, which depends on its relative location on the optical disc; a laser beam generator 10 for generating a laser beam that is focused to a photoresist on the optical disc; a laser beam permeating unit 100 for controlling selective transmission of the laser beam; a pickup location detector 30 for detecting a focused position of the transmitted laser on the optical disc; and a laser beam transmission controller 50 for controlling the laser beam permeating unit 100.

Figure 7:
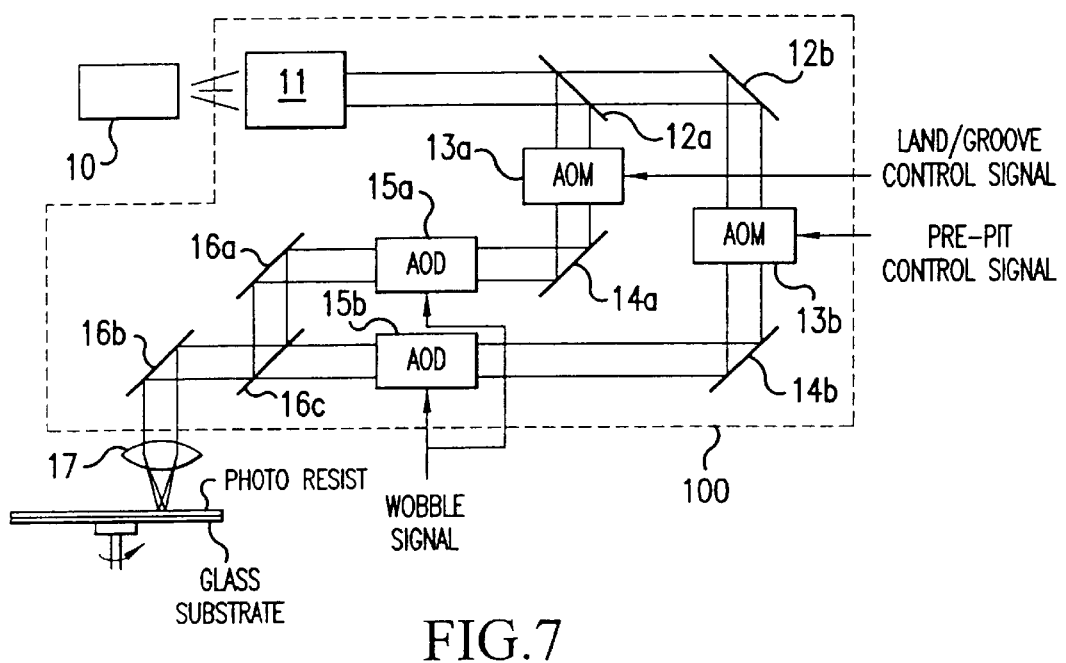
FIG. 7 is a schematic diagram of a beam permeating unit of the apparatus shown in FIG. 6.

FIG. 7 depicts the detailed configuration of the laser beam permeating unit 100, comprising a collimator 11 for collimating a laser beam from the laser beam generator 10 to produce a parallel beam; a semitransparent plane 12a and a reflecting plane 12b for changing the travel direction of the parallel beam; two acoustic optical modulators 13a and 13b for selectively transmitting the reflected beams according to a land/groove identification signal and a pre-pit control signal; two acoustic optical diffractors 15a and 15b for respectively for diffracting beams reflected by reflecting planes 14a and 14b, depending on frequency of a high-frequency signal; a semitransparent plane 16c and two reflecting planes 16a and 16b for producing a beam which is convergent on a photoresist on an optical disc from the two beams from the acoustic optical diffractors; and a convergent lens 17.

Figure 13:
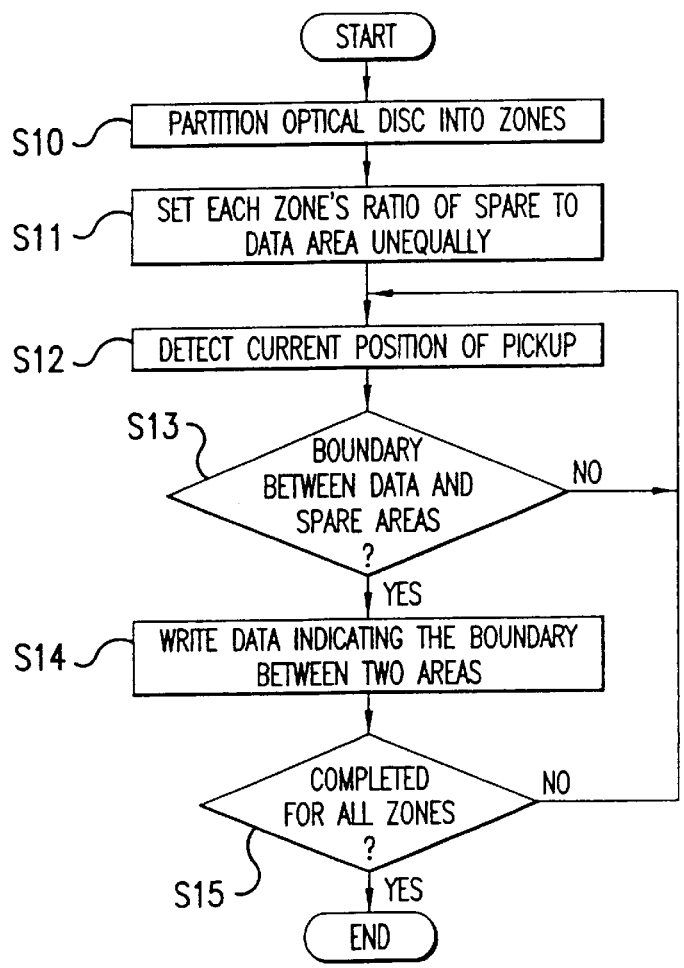
FIG. 13 is a flowchart showing a method of manufacturing an optical recording medium having information needed to discriminate data area and spare area.

The method for manufacturing an optical disc having information needed to discriminate data area and spare area will be explained in detail by referring to a flowchart of FIG. 13 and configurations of FIGS. 6 and 7.

The user area of an optical disc is partitioned into 24 groups, so-called zones (S10). While reading data from every track in the same zone, the disc is in the CAV drive mode.

Each zone's ratio of spare area to data area is then determined by taking into account its radial distance from the innermost circumference and is kept in the ratio setting unit 40 (S11). Accordingly, the ratio of spare area to data area is different from one zone to another.

It should be noted that the ratios are determined on the basis of the frequency with which defects arise in the data area. Specifically, zones near the outer radii have more sectors than zones near the inner radii. Accordingly, one might expect that zones near the outer radii would need more spare area to provide replacement spaces for defective sectors than zones near the inner radii. Such a variation in ratios of spare area to data area would be determined such that the ratio increases with increasing radius, as shown in waveform 52 of FIG. 5B. For context, the conventional art uniform 5% ratio is also depicted.

It has, however, turned out from experimental observations that zones near the inner and outer radii are more vulnerable to defect occurrence than zones near central radii because of some problems in the sputtering deposition process. Thus, inner and outer radii zones need relatively more of the spare area than central radii zones. It is, therefore, preferred that the ratios of zones near the inner and outer radii be larger than those of zones near the middle or central radii, as shown in waveform 54 of FIG. 5C. Again, for context, the conventional art uniform 5% ratio has been depicted.

Figure 5A:
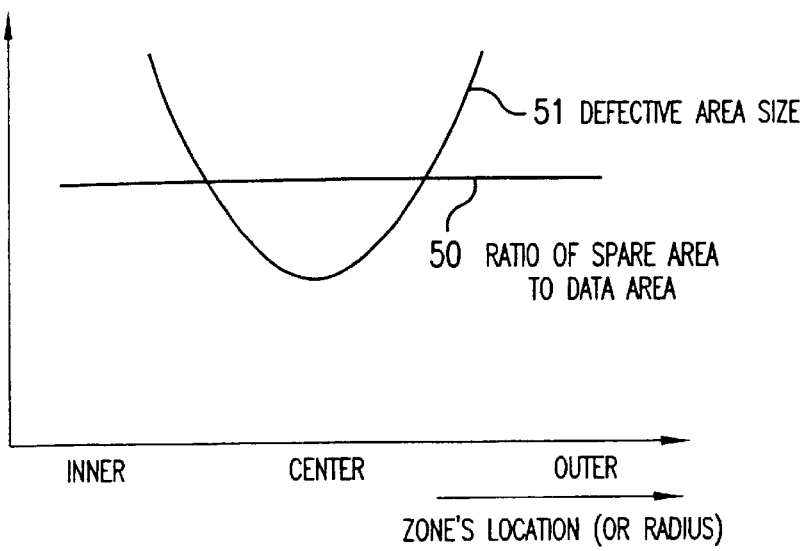
FIG. 5A is a plot illustrating a conventional ratio of spare area to data area with respect to the radius.
Figure 5B:
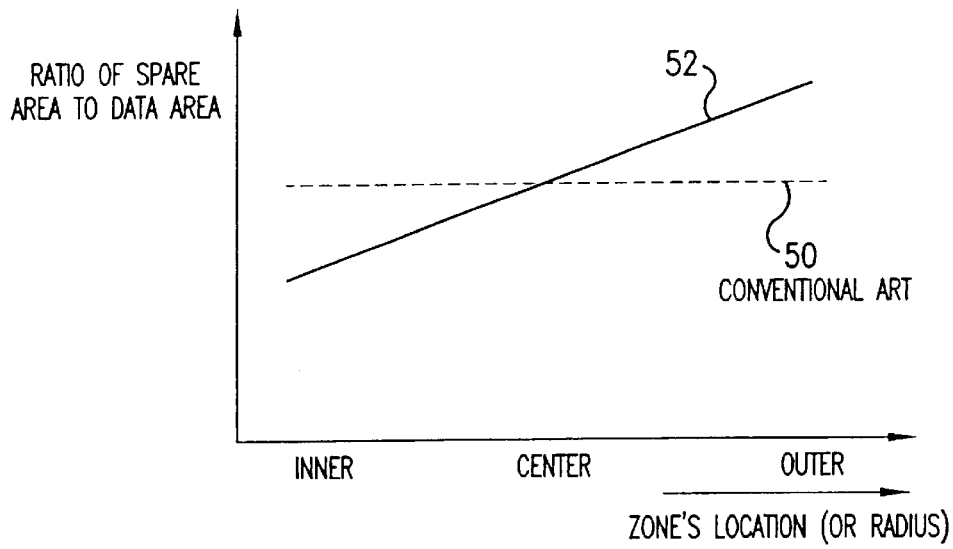
FIG. 5B is a plot representing a distribution of ratios of spare area to data area with respect to the radius.
Figure 5C:
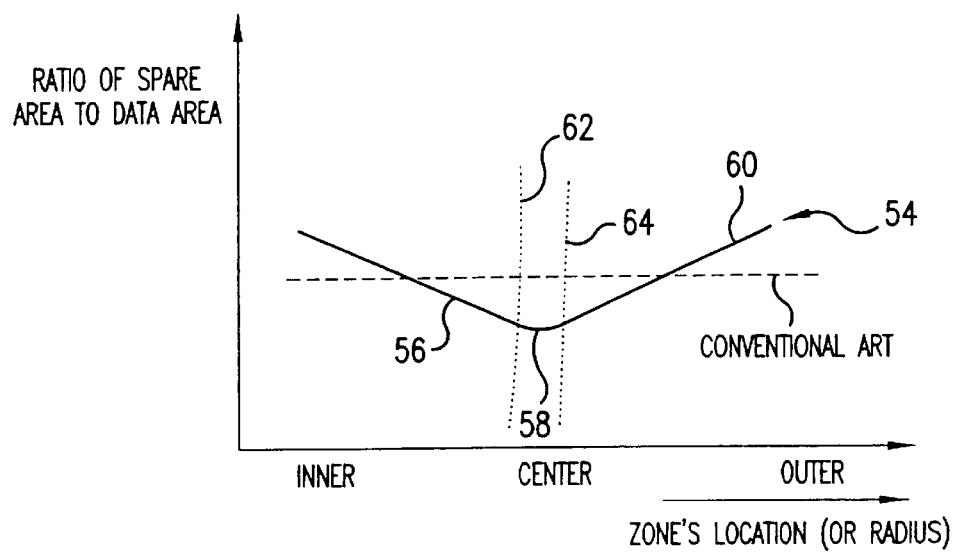
FIG. 5C is a plot illustrating a different distribution of spare area to data area ratios with respect to the radius, according to the present invention.

FIG. 5(c) has 3 parts to the waveform 54, a linearly decreasing portion 56, an upwardly-opening center portion 58 and a linearly increasing portion 60. The portion 56 changes over to portion 58 at edge 62, and the portion 58 changes over to the portion 60 at edge 64. The slope of portion 56 is preferably the negative of the slope of portion 60. The portion 58 is approximately parabolic. Alternatively, the waveform 54 could be a parabolic.

Once each zone's ratio is stored and an optical disc begins to be manufactured, the pickup location detector 30 starts to detect the position of the convergence lens 17 on the optical disc (S12), and determines whether or not the current position is coincident with the boundary between data area and spare area in the current zone by referring to the ratios stored in the ratio setting unit 40 (S13).

If the detected position is the boundary in the current zone, the laser beam transmission controller 50 inputs a predetermined pre-pit control signal to the laser beam permeating unit 100 so that information indicating the boundary between data area and spare area is written to a header portion in the form of pre-pit (S14). The heard portion is either the last header portion in the data area or the first one in the spare area in the current zone.

Figure 8:
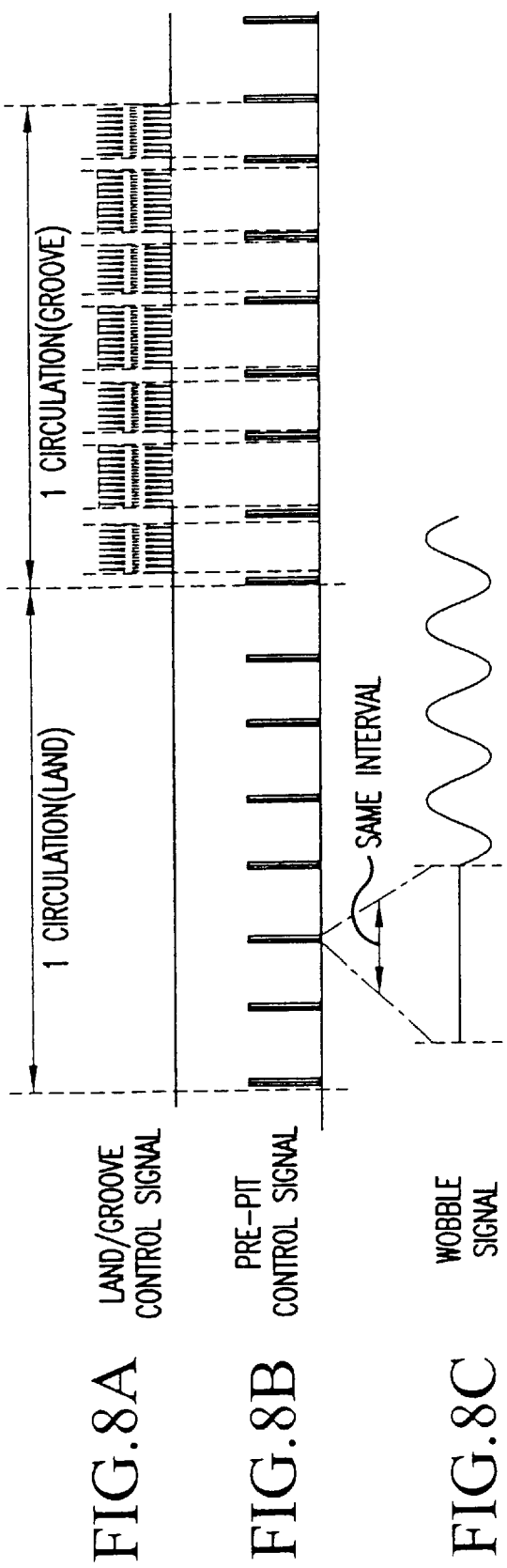
FIGS. 8(a)–8(c) illustrate control signals which are applied to the beam permeating unit of FIG. 7.

To be specific, a pre-pit control signal, which is a high-frequency ON/OFF signal shown in FIG. 8(b), is supplied to the acoustic optical modulator 13b. Whether or not an incident laser beam is transmitted depends on change of its diffraction angle, which is controlled by the ON/OFF state of the pre-pit control signal. The beam that is passed through the acoustic optical modulator 13b is reflected by the reflection plane 14b and is then incident to the acoustic optical diffractor 15b.

Figure 1:
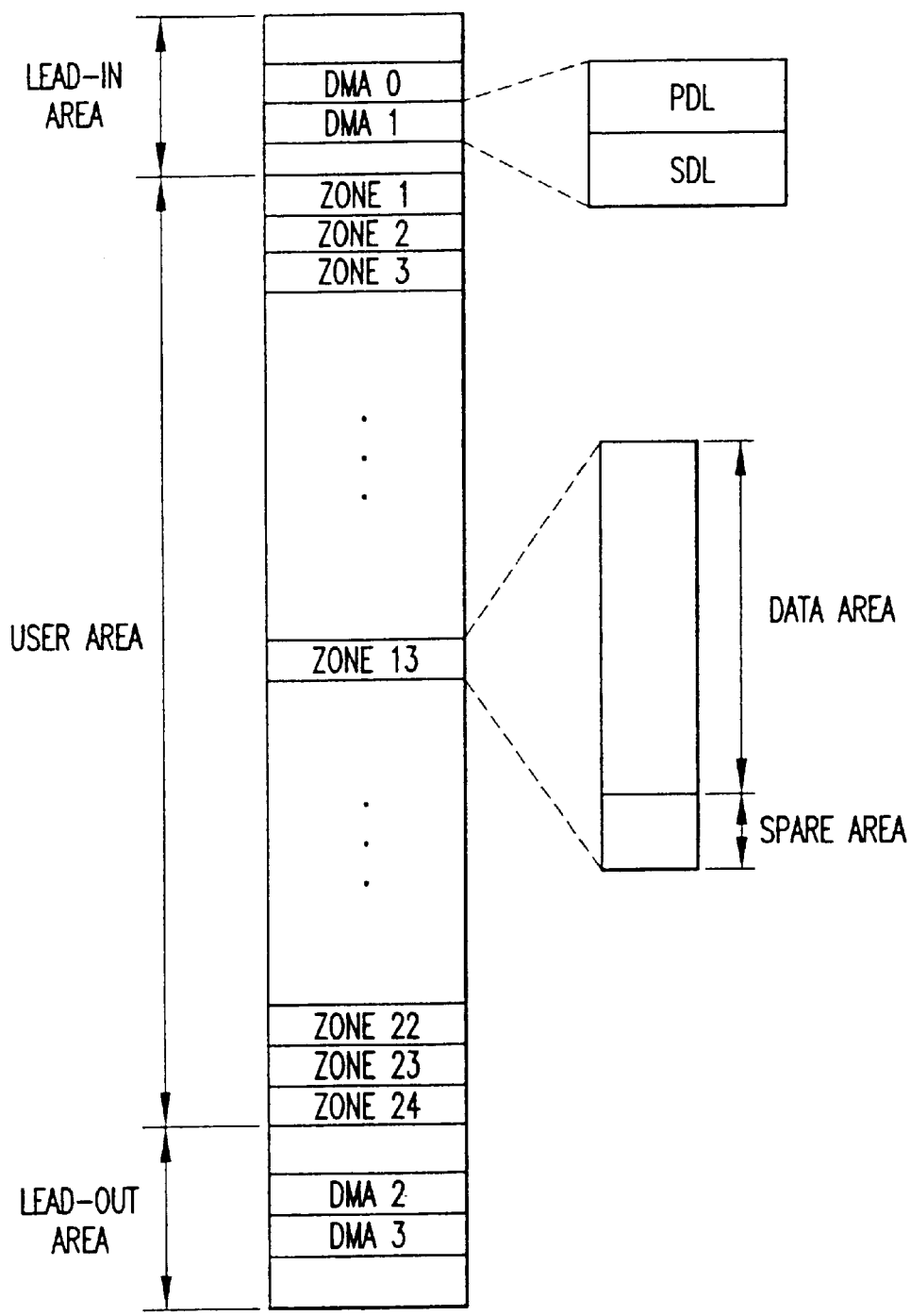
FIG. 1 is a layout figure representing a conventional partition of rewritable area of a DVD-RAM.
Figure 2:
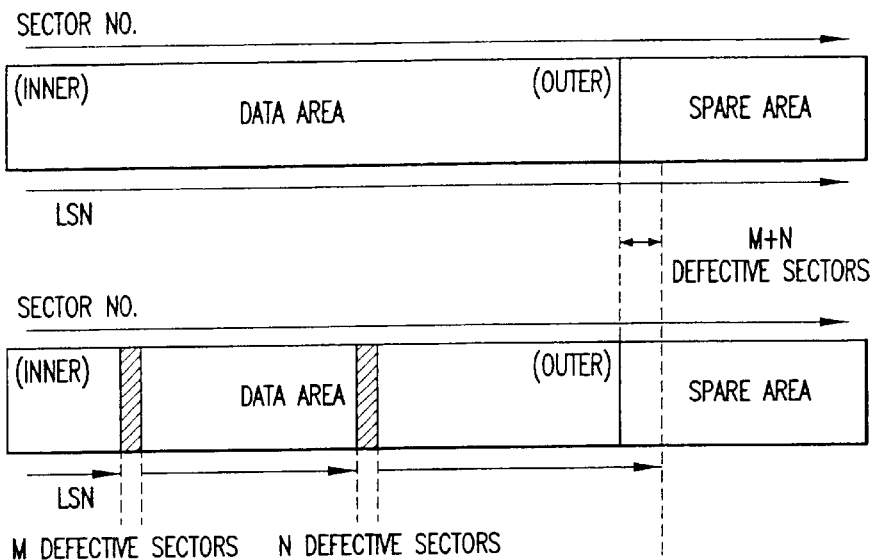
FIG. 2 is a drawing explaining the conventional slipping replacement algorithm in the write operation.
Figure 3:
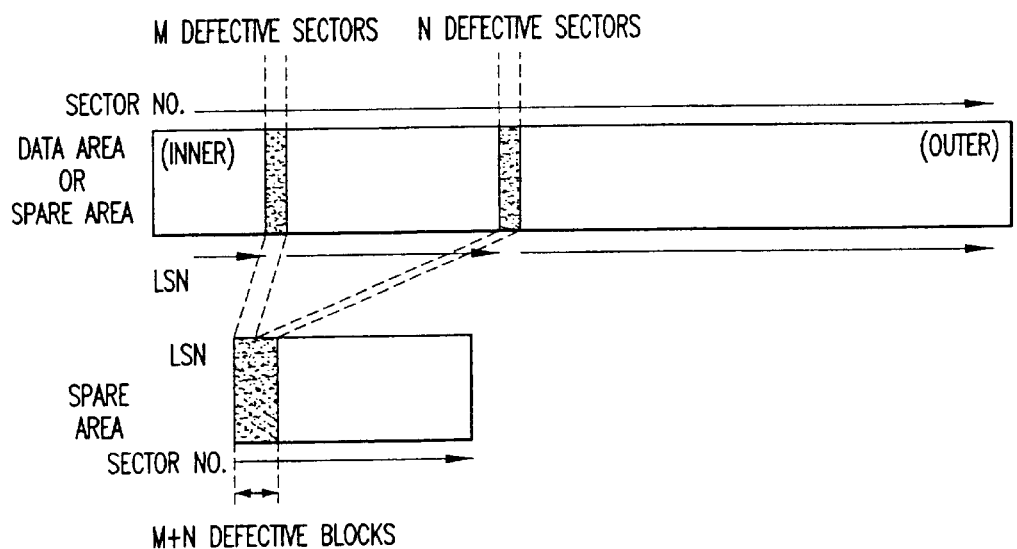
FIG. 3 is a drawing explaining a conventional linear replacement algorithm in the reproduction operation.
Figure 4:
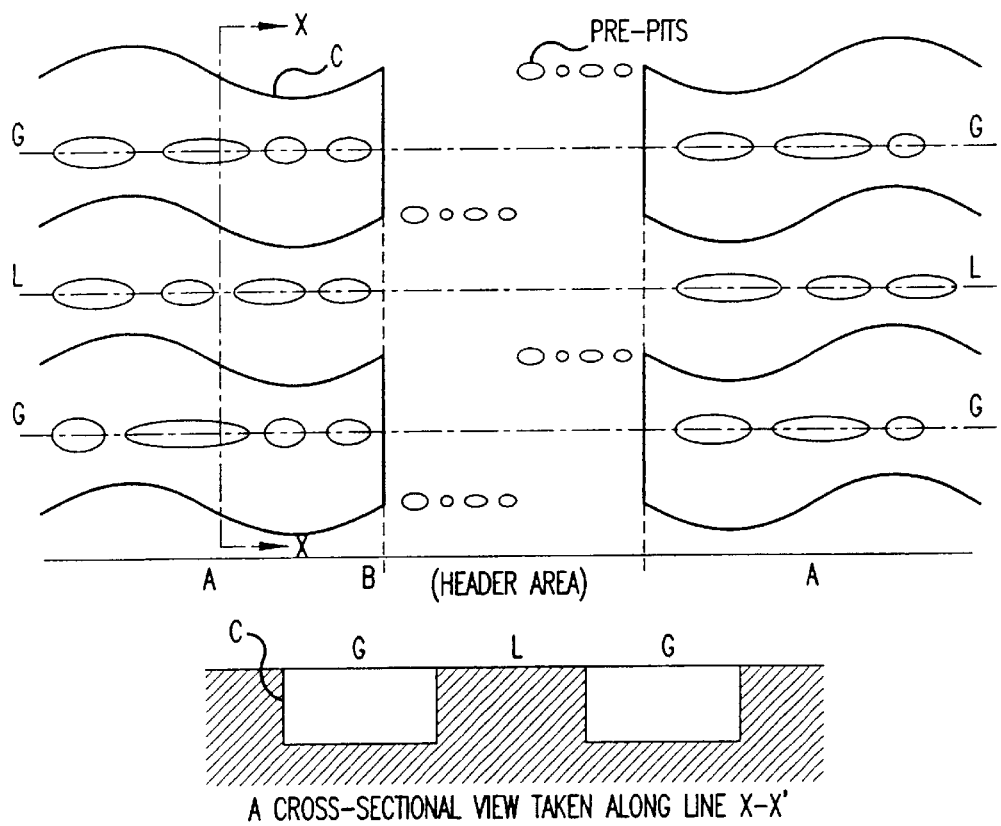
FIG. 4 is a schematic view showing a conventional physical configuration of recordable portions and header portions of a DVD-RAM.

While header portions are formed, the wobble signal is not applied to the acoustic optical diffractors 15a and 15b, thus the beams incident to the acoustic optical diffractors 15a are not diffracted. And then, through a reflecting plane 16b and a convergence lens 17, the beam that is passed through the acoustic optical modulator 13b and another beam that is passed through the acoustic modulator 13a controlled by a land/groove control signal are projected onto a photoresist on a glass substrate, which rotates at a constant angular speed. As a result, pre-pits are formed on header portions to indicate the boundary between data area and spare area, as shown in FIG. 4. That is, for every zone, distinguishable pre-pits are made at a header portion which is located at the desired boundary between data area and spare area. Thereafter, the stamper made by the above-described method is used to manufacture optical discs having non-uniform ratios of spare area and data area according to the present invention.

Unlike the foregoing embodiment, it is possible to write information notifying the start and end portion of the data area to a header portion that is located at the beginning of the data area, in the form of pre-pits. In this case, the pickup location detector 30 detects the start portion of each zone, and every time it is detected, the pre-pit control signal is controlled by the laser beam transmission controller 50 so that a predetermined number of pre-pits is made physically on the optical disc.

Instead of forming the distinguishable pre-pits at the boundary between data area and spare area, it is also possible that, at intervals of a predetermined unit area, e.g., every time the pre-pit are formed, information indicating whether the area is used for a data area or a spare area is additionally written to the start header portion of the unit area in the form of pre-pits.

Figure 9:
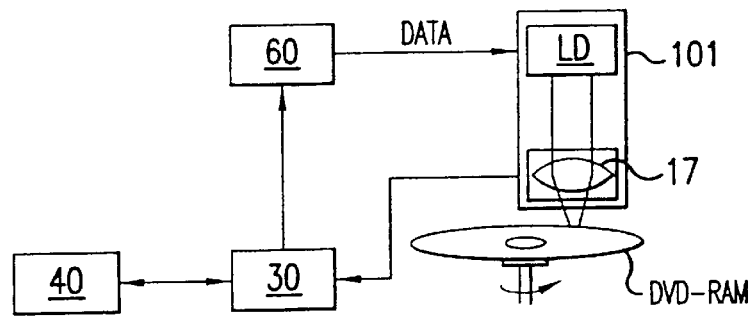
FIG. 9 is a schematic diagram of another apparatus for manufacturing an optical recording medium having information needed to discriminate data area and spare area according to the present invention.

FIG. 9 shows a block diagram of another apparatus for manufacturing an optical recording medium having information needed to discriminate the data area and spare area according to the present invention. This embodiment differs from the embodiment of FIG. 6 in that, after an optical disc is made by using a stamper manufactured by the conventional methods, information needed to discriminate the data area and spare area in each zone is written to the optical disc through the same operation as the data recording operation.

The apparatus according to this embodiment comprises a ratio setting unit 40 for keeping each zone's ratio of spare area to data area; an optical pickup 101 for reading/writing data from/to an optical disc; a pickup location detector 30 for detecting the current position of the optical pickup from data which is read out from the optical disc; and a data generator 60 for generating data needed to mark the boundary between data area and spare area and supplying it to the optical pickup 101 by taking into account the position of the optical pickup 101.

In this embodiment, based on information on each zone's ratio of spare area and data area and pre-pits on header portions, the optical pickup location detector 30 checks whether or not the current position of the optical pickup 101 is coincident with a desired boundary between data area and spare area in each zone, as in the foregoing embodiment of FIG. 6. Each time the boundary is detected, the data generator 60 inputs data needed to discriminate the two areas in each zone to the optical pickup 101 so that the data is written to a header portion or data area at the boundary point.

As another method, every time a boundary between data area and spare area is detected, location information on the boundary is added to a memory sequentially. Once detection of boundaries of all the zones is completed, the data generator 60 generates an information table which contains each zone's boundary from the stored location information and inputs it to the optical pickup 101, so that the information table is written in other areas than data area or spare area such as lead-in area and lead-out area.

Method and Apparatus for Writing Data to the Optical Disc

Figure 10:
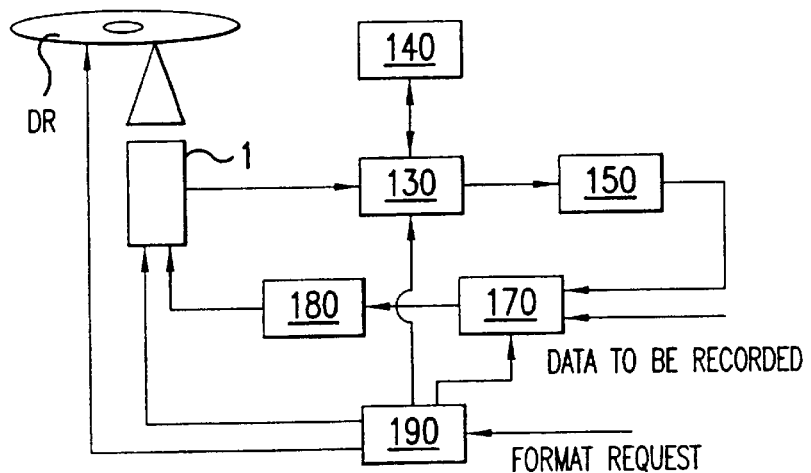
FIG. 10 is a schematic diagram of an apparatus for writing data to an optical recording medium having information needed to discriminate data area and spare area according to the present invention.

FIG. 10 shows a block diagram of an apparatus for writing information on a partition of each zone into data area and spare area for a recordable area of an optical disc which is made up of 24 zones, in which only a wobble signal and pre-pits are formed (not formatted yet), according to the present invention. This apparatus comprises a ratio setting unit 140 for keeping each zone's ratio of spare area to data area, which depends on its relative location on the optical disc DR; an optical pickup 1 for reading/writing data from/to the optical disc; a signal decoder 130 for decoding a signal received from the optical disc 1 and thus obtaining the current position of the optical pickup 1 from the decoded data; a data generator 150 for generating data needed to indicate the boundary between a data area and a spare area; a write signal processing unit 170 for converting the boundary indication data into a pit signal; a write laser controller 180 for controlling a period of time in which a laser beam of the optical pickup 1 is activated according to the pit signal; and a controller 190 for controlling the overall write operation.

Figure 14:
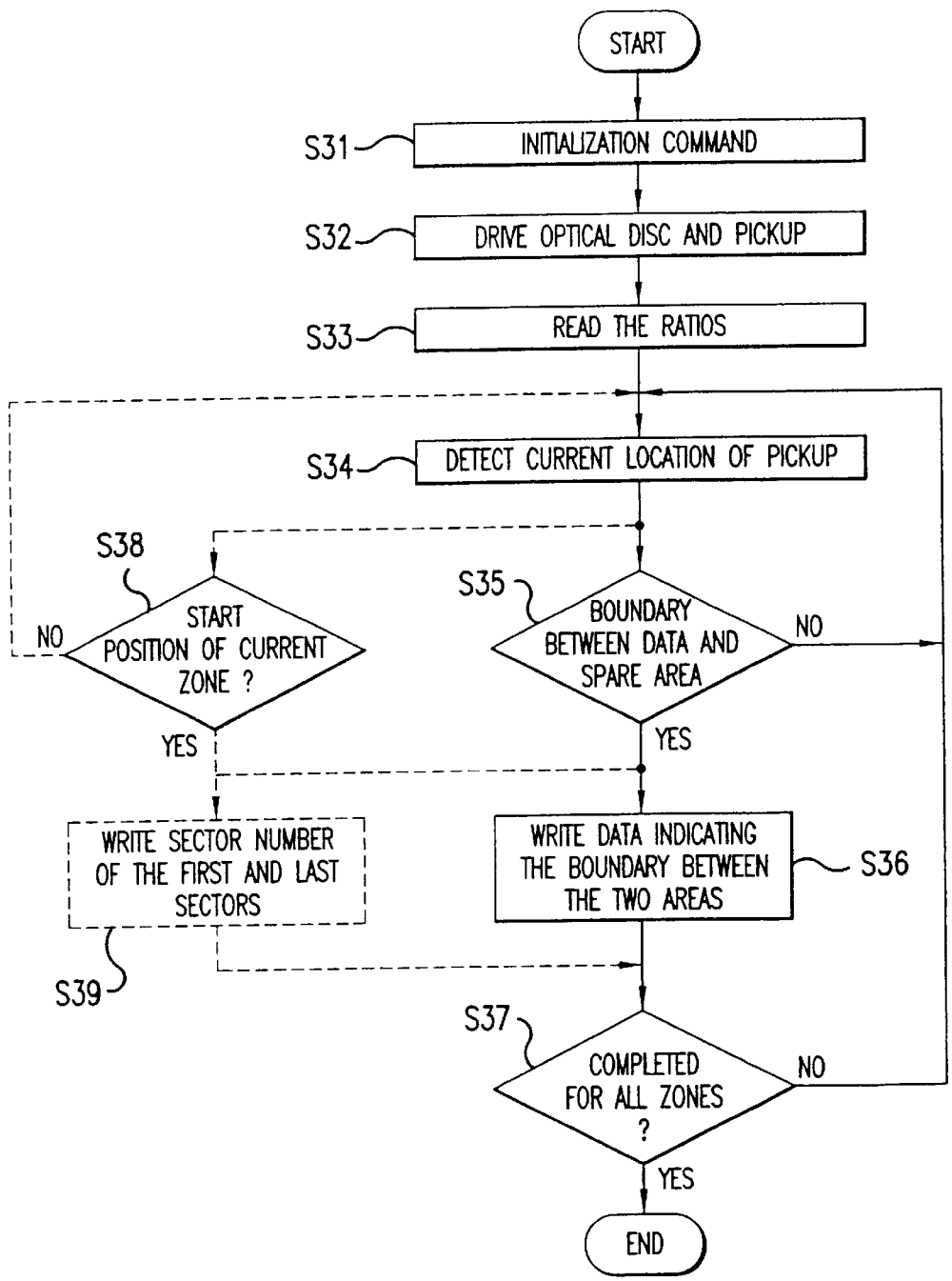
FIG. 14 is a flowchart showing a method of writing data to an optical recording medium having information needed to discriminate data area and spare area.

The operation of the apparatus configured as above is described below with reference to a flowchart of FIG. 14.

Under the state where non-uniform ratios of spare areas to data areas are stored in the ratio setting unit 140, as shown in FIGS. 5B and 5C, if an initialization operation such as a format command is issued (S31), the controller 190 starts to execute the operation to mark the boundary of the two areas in each zone on an optical disc. The controller 190 rotates an optical disc DR and drives the optical disc 1 (S32). When necessary, initialization data is sent to the write signal processing unit 170 so as to write the initialization data to the optical disc.

Each zone's ratio of spare area to data area is then retrieved from the ratio setting unit 140 (S33). Next, while the signal decoder 130 detects the current position of the optical pickup 1 (S34), it checks whether or not the current position is coincident with the desired boundary between the data area and the spare area in the current zone (S35).

If they are matched, the data generator 150 generates and supplies data needed to indicate the boundary between data area and spare area to the write signal processing unit 170. By the write laser controller 180, the data is then written at the boundary location on the optical disc, or either the start location of the spare area or the end location of the data area (S36).

Unlike the foregoing embodiment, it is possible that, every time the signal decoder 130 detects the start location of each zone during movement of the optical pickup, a pair of the start sector number and end sector number of each zone's data area is generated by the data generator 150 and is then written to a non-user data area preceding the data area (S39).

Instead of the boundary between a data area and a spare area, it is also possible that, at intervals of a predetermined area, e.g., for every set pre-pits formed on a header portion or in the unit of a sector or an ECC block, information indicating whether each one of the unit area is used for data area or spare area is additionally written to a non-user data area in the unit area which is provided at intervals of the chosen unit area.

Furthermore, information on all the boundaries between data area and spare area, which is represented by the associated sector numbers, may be written at a predetermined area in either the lead-in area or the lead-out area.

Figure 11:
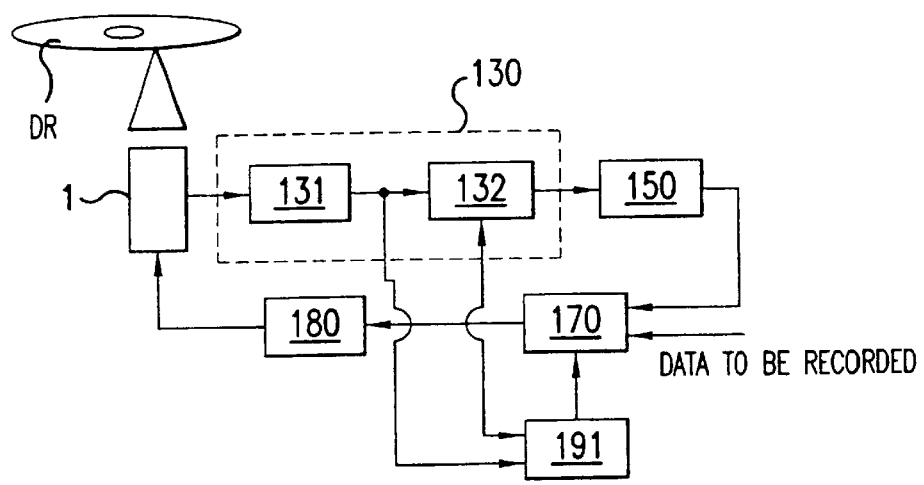
FIG. 11 is a schematic diagram of another apparatus for writing data to an optical recording medium having information needed to discriminate data area and spare area according to the present invention.

FIG. 11 shows a block diagram of an apparatus for writing data into an optical disc in which the ratio of spare area to data area is different from one zone to another, and which contains information needed to discriminate data area and spare area in each zone. The apparatus comprises an optical pickup 1 for reading/writing data from/to the optical disc; a signal decoder 131 for obtaining data from a read-out signal received from the optical pickup 1; a pickup location detector 132 for detecting the current position of the optical pickup 1 from the obtained data; a data generator 150 for generating data needed to discriminate data area and spare area; a write signal processing unit 170 for converting the data to be recorded into a pit signal; a write laser controller 180 for controlling a laser beam of the optical pickup 1; and a controller 191 for controlling the write signal processing unit 170.

In the apparatus configured as above, once a write operation is issued, the signal decoder 131 extracts positional data out of a signal read out from the optical disc by the optical pickup 1. Then, the positional data is sent to the controller 191 which controls the operation to obtain location of the data area in the current zone in which the optical pickup is located.

The start and end of the data area in the current zone which is detected by the pickup location detector 132 are obtained by using the positional data. Once the location of the data area is obtained, the controller 191 controls the write signal processing unit 170 so that data to be recorded (including data temporarily stored in a buffer during the operation to locate data area) is processed and is then written to the optical disc.

During the write operation, the controller 191 checks if the optical pickup reaches the end of the data area in the current zone by using the optical pickup's location obtained by the pickup location detector 130 or information on the area type obtained by the signal decoder 131. If the end of the data area is detected, the data being recorded is no longer supplied to the write laser controller 180 and the optical pickup is maintained in a ready state before it is moved to the next zone.

Then, if the optical pickup starts to be moved to the next zone, the start and end location of the data area in the next zone are obtained in the same way as before, and thus the write operation is resumed at the data area in the next zone.

Method and Apparatus for Reproducing the Optical Disc

Figure 12:
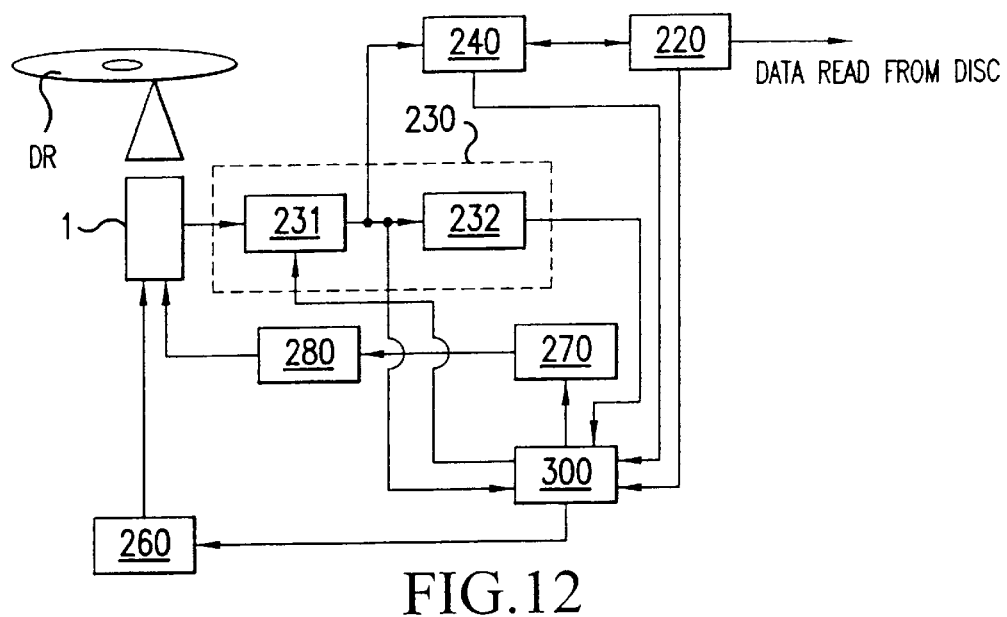
FIG. 12 is a schematic diagram of a partial configuration of a VDR player embodying an apparatus for playing an optical recording medium having information needed to discriminate data area and spare area according to the present invention.

FIG. 12 shows a block diagram of an apparatus for reproducing data from an optical disc having information needed to discriminate data area and spare area, which was made by the above-mentioned manufacturing and writing apparatus. The apparatus comprises an optical pickup 1 for reading/writing data from/to the optical disc; a signal decoder 231 for obtaining data by decoding the signal read out from the optical pickup 1; a pickup location detector 232 for detecting the current position of the optical pickup 1 from the obtained data; a defect checking unit 240 for checking the presence of defects in the obtained data in the unit of sector; a memory 220 for temporarily storing data during replacement operation; a pickup driving unit 260 for driving the optical pickup 1 to a spare area assigned to the zone in which defective sector(s) are detected; a write signal processing unit 270 for converting data to be recorded into a pit signal; a write laser controller 280 for controlling a period of time in which the laser beam of the optical pickup 1 is activated; and a controller 300 for controlling the whole operation of the above-described components.

Figure 15:
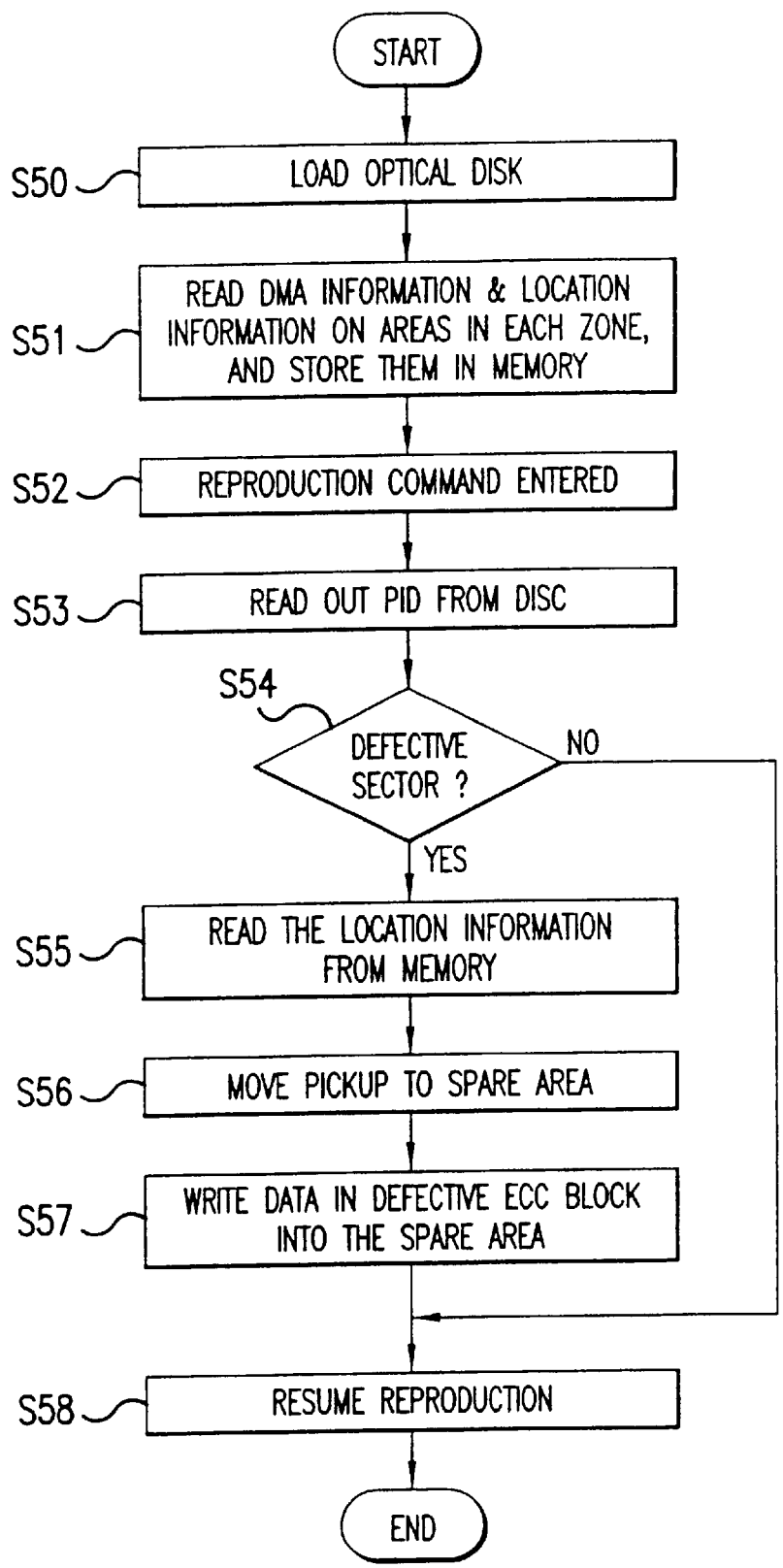
FIG. 15 is a flowchart showing a method of reproducing data from an optical recording medium having information needed to discriminate data area and spare area.

The operation of the apparatus of FIG. 12 is described below in detail by referring to a flowchart of FIG. 15.

Once the optical disc is loaded into the reproducing apparatus (S50), the optical pickup 1 is moved to a lead-in area or lead-out area in order to read out PDL and SDL, together with information on locations of data area and spare area in each zone, and store them in the memory 220 (S51).

After that, once a reproduction operation is issued (S52), data starts to be read out from the optical disc. During a read-out process, by referring to the PDL and SDL in the memory 220, sectors listed in the two defect lists are skipped so as not to read out data from those defective sectors.

For non-defective sectors, data is obtained from the optical disc by the signal decoder 231 (S53). By using physical identification (PID) contained in the obtained data, the defect checking unit 240 then checks if each sector is defective (S54). If it is determined that the sector is a defective one, the location of data area and spare area in the current zone to which the defective sector belongs is read from the memory 220 by the controller 300 (S55). And then, by using the location information, the pickup driving unit 260 moves the optical pickup 1 to the spare area assigned to the current zone (S56).

When the optical pickup 1 is located at an appropriate area of the spare-area, the data which has been recorded in an ECC block containing the defective sector, and which is now temporarily stored in the memory 220 is supplied to the write signal processing unit 270. By the write laser controller 280, the data is then written to the spare area (S57). After that, the optical pickup 1 is returned to the next ECC block in the data area, the reproduction operation is resumed (S58). At the same time, location of the area in which the data is written on the spare area is added to the PDL/SDL loaded in the memory 220. Thus, in the subsequent reproduction, the ECC block identified as defective is skipped and thus the corresponding ECC block on the spare area is read out.

As another embodiment, a user recordable area of the optical disc is partitioned into a plurality of unit areas of equal size, each belonging to either a data area or a spare area, for example, for every pre-pit indicating a header portion or in the unit of sector or ECC block. When defective sectors are detected during reproduction, data that has been recorded on defective sectors are moved to the unit areas assigned to the spare area, which are identified on the basis of the information indicating the type of unit area.

During the reproduction operation, i.e., while the signal decoder 231 obtains data from a signal read out by the optical pickup 1 and stores them in the memory 220, the pickup location detector 232 detects the end location of the data area in the current zone from the data obtained from the signal decoder 231.

Specifically, the pickup location detector 232 checks if the optical pickup 1 is located at the end of the data area in the current zone by comparing positional information contained in the data obtained by the signal decoder 231, e.g., the sector identification number with positional data of the data area and the spare area, or by identifying positional data indicating whether the unit area belongs to a data area or a spare area. Once the end of the data area in the current zone is detected, the pickup location detector 232 sends the end detection signal to the controller 300. And then, the operation of the signal decoder 231 is stopped and the optical pickup 1 gets ready to move the next zone, under control of the controller 300.

If the optical pickup 1 starts to be moved to the next zone, the start location of the data area in the next zone is obtained in the same way as before, and thus data recorded in the next zone is reproduced correctly.

Figure 16A:
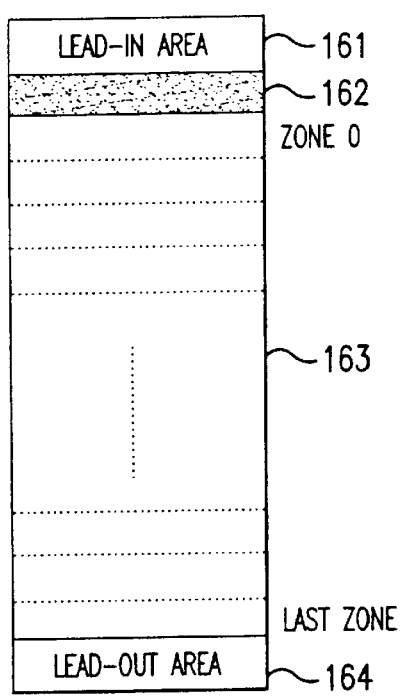
FIGS. 16(a) and 16(b) illustrate the structure of a recording medium having a spare area and data area, and information needed to discriminate among the data area and spare area according to the present invention.

FIG. 16(a) illustrates a recording medium structured and arranged in accordance with a preferred embodiment of the present invention. The recording medium of FIG. 16(a) has lead-in area 161, spare area 162, data area 163 and lead-out area 164. Data area 163 has a series of zones indicated by broken lines. The recording medium of FIG. 16(a) is structured such that lead-in area 161 is followed by spare area 162, which is followed by data area 163, which is followed by lead-out area 164. Lead-in area 161 and lead-out area 164 are structured and arranged to store information needed to discriminate among the spare area and data area.

Figure 16B:
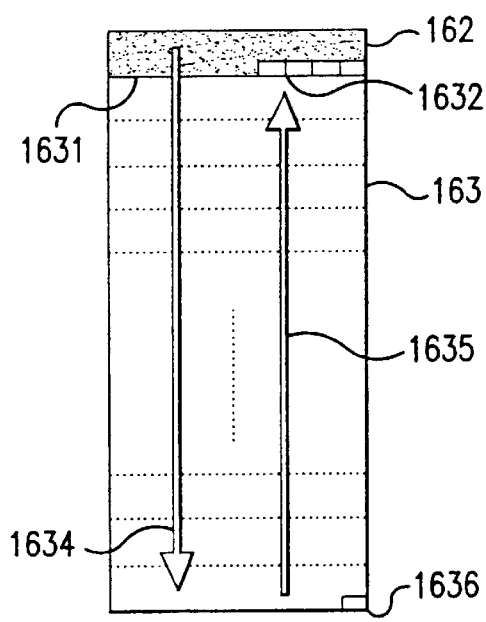

FIG. 16(b) also illustrates a recording medium structured and arranged in accordance with a preferred embodiment of the present invention. Like the recording medium of FIG. 16(a), the recording medium of FIG. 16(b) has a lead-in area (not shown), a spare area 162, a data area 163, and a lead-out area (not shown). As demonstrated by FIG. 16(b), the size of spare area 162 may be changed based on the number of defective sectors on the recording medium, particularly within data area 163. Specifically, as the number of defective sectors increases, the size of the spare area is reduced. FIG. 16(b) illustrates an example in which the recording medium has four (4) defective sectors, causing a decrease in the size of the spare area 162 by four (4) sectors. In this example, due to the existence of defective sectors, the original start position of data area 163 is moved from a position corresponding to reference number 1631 to a position corresponding to reference number 1632.

FIG. 16(b) includes reference arrows designated by reference numerals 1634 and 1635. Reference arrow 1634 is used to illustrate a process in which the entire recording medium is scanned for defective sectors. Reference arrow 1635 is used to designate the process of assigning logical sector numbers (LSN) to sectors not deemed defective, beginning with the sector shown at reference number 1636. Through this process, information regarding a boundary between the data area and spare area is written as the first and last sector number of the spare area in DMA (Defective Management Area), allocated in the lead-in and lead-out areas.

The present invention makes it possible to avoid extra or insufficient allocation of spare areas on the optical recording medium by apportioning each zone's ratio of spare area to data area unequally based on experimental observations on the frequency with which defects arise with respect to each zone's relative location. Therefore, the present invention provides a way of reducing the possibility of that some zones run short of spare area or have excessive spare area, resulting in a more efficient use of the optical recording medium.

The foregoing is provided only for the purpose of illustration and explanation of the preferred embodiments of the present invention, so changes, variations and modifications may be made without departing from the spirit and scope of the invention.

What is claimed is:

1. A method for writing to an information recording medium having a data area for recording data and a spare area for replacing defective units within said data area, wherein a boundary on said information recording medium between said data area and said spare area is variable, the method comprising:

writing information to a predetermined area on said information recording medium, said information concerning the variable boundary between said data area and said spare area; and controlling an operation for recording of defective units on said information recording medium based on said information concerning the variable boundary.

2. A method according to claim 1, wherein said data area is divided into a plurality of data area parts that are positioned adjacent to each other, and said spare area is divided into a plurality of spare area parts that are positioned adjacent to each other.

3. A method according to claim 1, wherein said predetermined area is at least one of a lead-in area and a lead-out area on said information recording medium.

4. A method according to claim 1, wherein said boundary information is sector address information corresponding to at least one of said data area and said spare area.

5. An apparatus for writing to an information recording medium having a, data area for recording data and a spare area for replacing defective units within said data area, wherein a boundary on said information recording medium between said data area and said spare area is variable, the apparatus comprising:

writing circuitry to write information concerning the variable boundary between said data area and said spare area to a predetermined area on said information recording medium; and a controller to control an operation for recording of defective units on said information recording medium based on said information concerning the variable boundary.

6. An apparatus according to claim 5, wherein said data area is divided into a plurality of data area parts that are positioned adjacent to each other, and said spare area is divided into a plurality of spare area parts that are positioned adjacent to each other.

7. An apparatus according to claim 5, wherein said predetermined area is at least one of a lead-in area and a lead-out area on said information recording medium.

8. An apparatus according to claim 5, wherein said information concerning the boundary is sector address information corresponding to at least one of said data area and said spare area.

9. A method for reading from an information recording medium having a data area for recording data and a spare area for replacing defective units within said data area, wherein a boundary on said information recording medium between said data area and said spare area is variable, the method comprising:

reading information from a predetermined area on said information recording medium, said information concerning the variable boundary between said data area and said spare area; and controlling an operation for reading of defective units on said information recording medium based on said information concerning the variable boundary.

10. A method according to claim 9, wherein said predetermined area is at least one of a lead-in area and a lead-out area on said information recording medium.

11. A method according to claim 9, wherein said boundary information is sector address information corresponding to at least one of said data area and said spare area.

12. An apparatus for reading from an information recording medium having a data area for recording data and a spare area for replacing defective units within said data area, wherein a boundary on said information recording medium between said data area and said spare area is variable, the apparatus comprising:

reading circuitry to read information from a predetermined area on said information recording medium, said information concerning the variable boundary between said data area and said spare area; and a controller to control an operation for reading of defective units on said information recording medium based on said information concerning the variable boundary.

13. An apparatus according to claim 12, wherein said predetermined area is at least one of a lead-in area and a lead-out area on said information recording medium.

14. An apparatus according to claim 12, wherein said information concerning the boundary is sector address information corresponding to at least one of said data area and said spare area.

* * * * *